US011889454B2

(12) United States Patent
Park et al.

(10) Patent No.: US 11,889,454 B2
(45) Date of Patent: Jan. 30, 2024

(54) APPARATUS AND METHOD FOR SUPPORTING ACCESS TO PRIVATE MOBILE COMMUNICATION NETWORK AND CARRIER MOBILE COMMUNICATION NETWORK

(71) Applicant: Samsung Electronics Co., Ltd., Suwon-si (KR)

(72) Inventors: Jungshin Park, Suwon-si (KR); Sangjun Moon, Suwon-si (KR); Youngkyo Baek, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 17/250,936

(22) PCT Filed: Sep. 27, 2019

(86) PCT No.: PCT/KR2019/012574
§ 371 (c)(1),
(2) Date: Mar. 30, 2021

(87) PCT Pub. No.: WO2020/071689
PCT Pub. Date: Apr. 9, 2020

(65) Prior Publication Data
US 2021/0392605 A1 Dec. 16, 2021

(30) Foreign Application Priority Data
Oct. 5, 2018 (KR) .................... 10-2018-0119323

(51) Int. Cl.
*H04W 60/00* (2009.01)
*H04W 12/06* (2021.01)
(Continued)

(52) U.S. Cl.
CPC ......... *H04W 60/005* (2013.01); *H04W 12/06* (2013.01); *H04W 48/20* (2013.01); *H04W 12/71* (2021.01)

(58) Field of Classification Search
CPC ....................................................... H04W 8/06
(Continued)

(56) References Cited

U.S. PATENT DOCUMENTS 8,712,411 B1 * 4/2014 Puliatti ................... H04W 4/00
455/434
2013/0331063 A1 12/2013 Cormier et al.
(Continued)

FOREIGN PATENT DOCUMENTS

WO 2018097601 A1 5/2018

OTHER PUBLICATIONS

Written Opinion of the International Searching Authority dated Jan. 6, 2020 in connection with International Patent Application No. PCT/KR2019/012574, 4 pages.
(Continued)

*Primary Examiner* — Kiet M Doan

(57) ABSTRACT

The disclosure provides a method of registering a user equipment (UE) at a second network via a first network, the method including: receiving, from the UE, a registration request message including at least one of first network identification (ID) information, ID information of the UE in the first network, second network ID information, and ID information of the UE in the second network; selecting an authentication server function (AUSF) of the first network which is configured to perform a first authentication procedure of service subscription authentication for the UE in the first network; performing the first authentication procedure with the AUSF of the first network and unified data management (UDM) of the first network; determining, based on
(Continued)

a result of the first authentication procedure, whether to perform a second authentication procedure of service subscription authentication for the UE in the second network; performing, based on a result of the determining, the second authentication procedure with an AUSF of the second network and UDM of the second network; and transmitting, to the UE, a registration acceptance message including information of at least one of the result of the first authentication procedure and a result of the second authentication procedure.

11 Claims, 9 Drawing Sheets

(51) Int. Cl.
    *H04W 48/20*     (2009.01)
    *H04W 12/71*     (2021.01)

(58) Field of Classification Search
    USPC .................................... 455/405, 411, 435.2
    See application file for complete search history.

(56) References Cited

U.S. PATENT DOCUMENTS

| | | |
|---|---|---|
| 2018/0376445 A1 | 12/2018 | Yoon et al. |
| 2019/0053104 A1* | 2/2019 | Qiao ..................... H04M 15/66 |

OTHER PUBLICATIONS

International Search Report and Written Opinion of the International Searching Authority in connection with International Application No. PCT/KR2019/012574 dated Jan. 6, 2020, 10 pages.
Ericsson, "Authentication related services," S2-183476 (revision of S2-18xxxx), SA WG2 Meeting #127, Sanya, P.R. China, Apr. 16-20, 2018, 13 pages.
Nokia, et al., "Slice Specific Authentication and Authorization using non 3GPP credentials—Solution," S2-187918 (updated revision of S2-18xxxx), SA WG2 Temporary Document, SA WG2 Meeting #128, Sophia Antipolis, France, Aug. 20-24, 2018, 5 pages.
SAMSUNG, "Solution for the key issue #1 NW discovery & selection for non-public networks," S2-188277 (was S2-18xxxx), Sa WG2 Meeting #128-bis, Sophia-Antipolis, France, Aug. 20-24, 2018, 3 pages.
Supplementary European Search Report dated Nov. 3, 2021, in connection with European Application No. 19868941.6, 12 pages.
3GPP TR 23.734 V0.2.0 (Sep. 2018), Technical Report, 3rd Generation Partnership Project; Technical Specification Group Services and System Aspects; Study on 5GS Enhanced support of Vertical and LAN Services; (Release 16), Sep. 2018, 37 pages.
SAMSUNG, "Solution for interworking between a non-public and a public network," S2-1810642, SA WG2 Meeting #129, Dongguan, China, Oct. 15-19, 2018, 4 pages.
Communication under Rule 71(3) EPC dated May 17, 2023, in connection with European Application No. 19868941.6, 52 pages.

* cited by examiner

APPARATUS AND METHOD FOR SUPPORTING ACCESS TO PRIVATE MOBILE COMMUNICATION NETWORK AND CARRIER MOBILE COMMUNICATION NETWORK

CROSS-REFERENCE TO RELATED APPLICATIONS

This application is a 371 National Stage of International Application No. PCT/KR2019/012574, filed Sep. 27, 2019, which claims priority to Korean Patent Application No. 10-2018-0119323 filed on Oct. 5, 2018, the disclosures of which are herein incorporated by reference in their entirety.

BACKGROUND

1. Field

The disclosure relates to an apparatus and method for controlling a network-registration operation of a user equipment (UE) to perform transmission and reception of data by using a non-public mobile communication network and a public mobile communication network in a mobile communication system including the non-public mobile communication network and the public mobile communication network.

2. Description of Related Art

To meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency millimeter-wave (mmWave) band (e.g., a 60-gigahertz (GHz) band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 3eG5G communication technology and IoT technology.

Because various services can be provided due to the afore-described technical features and the development of a mobile communication system, there is a demand for an effective method for supporting a user equipment (UE) to register at a non-public mobile communication network and a public mobile communication network.

SUMMARY

The disclosure provides operations of a user equipment (UE), in which the UE is registered at a network so as to perform transmission and reception of data by using a non-public mobile communication network and a public mobile communication network in a mobile communication system including the non-public mobile communication network and the public mobile communication network.

Embodiments of the disclosure provide a method of registering a user equipment (UE) at a network in a mobile communication system.

Embodiments provide an apparatus and method for effectively providing a service in a mobile communication system.

DETAILED DESCRIPTION

Figure 1:
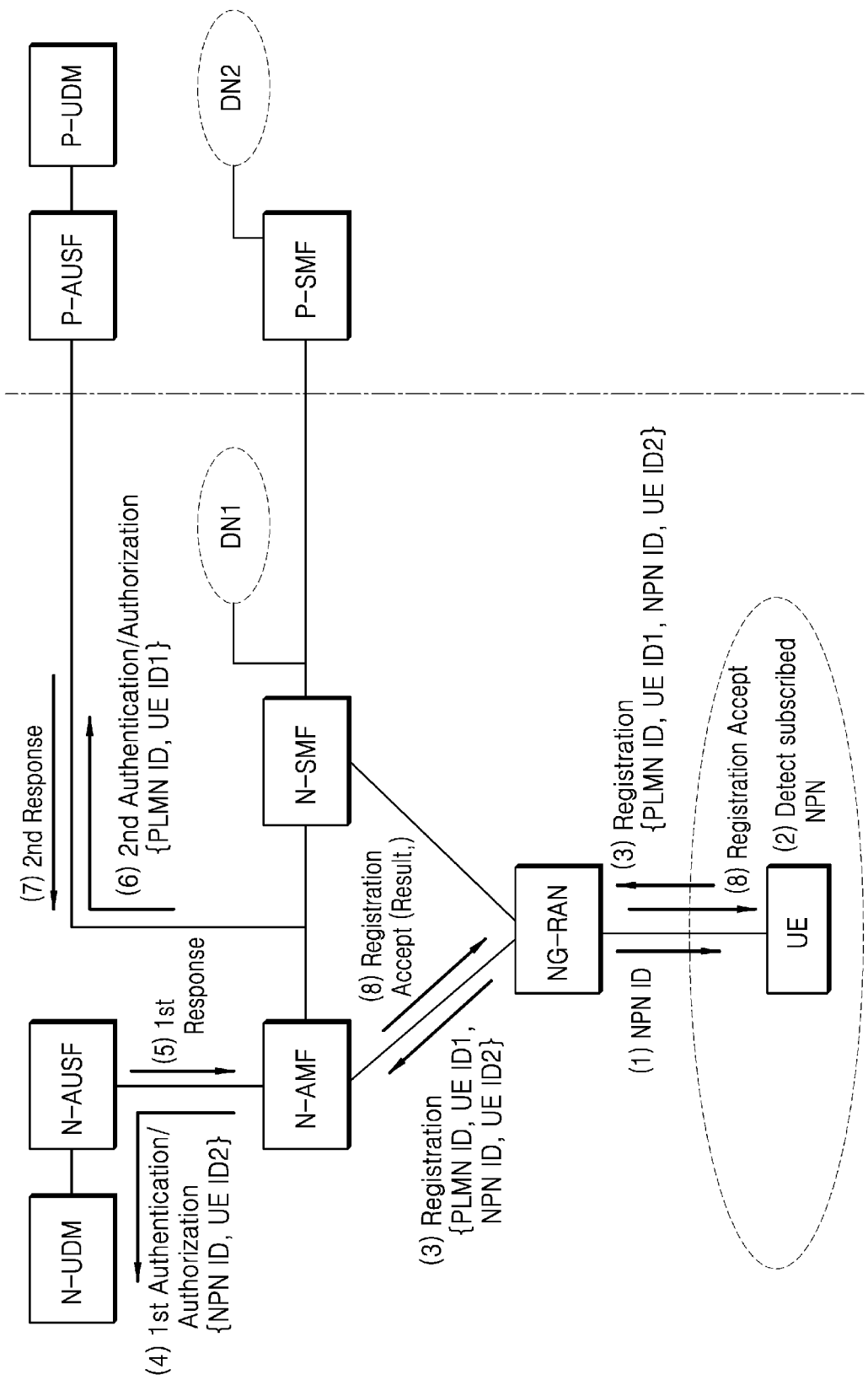
FIGS. 1 and 2 illustrate system architecture and an operation model for supporting authentication of a public network and a non-public network in a procedure of registering a user equipment (UE), according to an embodiment of the disclosure.

According to an embodiment of the disclosure, a method of registering a user equipment (UE) at a second network via a first network may include: receiving, from the UE, a registration request message including at least one of first network identification (ID) information, ID information of the UE in the first network, second network ID information, and ID information of the UE in the second network; selecting an authentication server function (AUSF) of the first network which is configured to perform a first authentication procedure of service subscription authentication for the UE in the first network; performing the first authentication procedure with the AUSF of the first network and unified data management (UDM) of the first network; determining, based on a result of the first authentication procedure, whether to perform a second authentication procedure of service subscription authentication for the UE in the second network; performing, based on a result of the determining, the second authentication procedure with an AUSF of the second network and UDM of the second network; and transmitting, to the UE, a registration acceptance message including information of at least one of the result of the first authentication procedure and a result of the second authentication procedure.

The method may further include: requesting the UE for stored UE authentication information; and receiving, from the UE, the UE authentication information.

The method may further include registering information indicating that the UE has started use of a first network service, at the UDM of the first network and a policy control function (PCF) of the first network, based on the result of the first authentication procedure.

The method may further include registering information indicating that the UE has started use of a second network service, at the UDM of the first network and the PCF of the first network, based on the result of the second authentication procedure.

The performing of, based on the result of the determining, the second authentication procedure with the AUSF of the second network for the service subscription authentication for the UE in the second network may include: determining whether the second network ID information and the ID information of the UE in the second network are included in the registration request message; and obtaining, from the UE, at least one of the second network ID information and the ID information of the UE in the second network, based on a result of the determining.

The first network may be a non-public network, and the second network may be a public network.

The first network may be a public network, and the second network may be a non-public network.

According to an embodiment of the disclosure, a method of registering a user equipment (UE) at a second network via a first network may include: transmitting, to an access and mobility management function (AMF) of the first network, a registration request message including at least one of first network identification (ID) information, ID information of the UE in the first network, second network ID information, and ID information of the UE in the second network; receiving, from the AMF of the first network, a request of UE authentication information stored in the UE; transmitting, the AMF of the first network, the UE authentication information; and receiving, from the AMF of the first network, a registration acceptance message.

The registration acceptance message may include information of at least one of a result of a first authentication procedure of service subscription authentication for the UE in the first network and a result of a second authentication procedure of service subscription authentication for the UE in the second network.

The first authentication procedure may be performed by the AMF of the first network, an authentication server function (AUSF) of the first network, and unified data management (UDM) of the first network, and the second authentication procedure may be performed by an AMF of the second network, an AUSF of the second network, and UDM of the second network.

The method may further include: receiving, from a base station of the first network, system information; and determining, based on the system information, whether service provision in the second network is available, and wherein the transmitting of the registration request message may include, when the service provision is available, transmitting the second network ID information and the ID information of the UE in the second network through the registration request message.

According to an embodiment of the disclosure, an access and mobility management function (AMF) of a first network which registers a user equipment (UE) at a second network via the first network may include: a transceiver; and a controller combined with the transceiver and configured to receive, from the UE, a registration request message including at least one of first network identification (ID) information, ID information of the UE in the first network, second network ID information, and ID information of the UE in the second network, select an authentication server function (AUSF) of the first network which is configured to perform a first authentication procedure of service subscription authentication for the UE in the first network, perform the first authentication procedure with the AUSF of the first network and unified data management (UDM) of the first network, determine, based on a result of the first authentication procedure, whether to perform a second authentication procedure of service subscription authentication for the UE in the second network, perform, based on a result of the determining, the second authentication procedure with an AUSF of the second network and UDM of the second network, and transmit, to the UE, a registration acceptance message including information of at least one of the result of the first authentication procedure and a result of the second authentication procedure.

The controller may be configured to request the UE for stored UE authentication information, and receive the UE authentication information from the UE.

The controller may be configured to register information indicating that the UE has started use of a first network service, at the UDM of the first network and a policy control function (PCF) of the first network, based on the result of the first authentication procedure.

The first network may be a public network, and the second network may be a non-public network.

According to an embodiment of the disclosure, a user equipment (UE) that registers at a second network via a first network may include: a transceiver; and a controller combined with the transceiver and configured to transmit, to an access and mobility management function (AMF) of the first network, a registration request message including at least one of first network identification (ID) information, ID information of the UE in the first network, second network ID information, and ID information of the UE in the second network, receive, from the AMF of the first network, a request of UE authentication information stored in the UE, transmit, the AMF of the first network, the UE authentication information, and receive, from the AMF of the first network, a registration acceptance message, wherein the registration acceptance message may include information of at least one of a result of a first authentication procedure of service subscription authentication for the UE in the first network and a result of a second authentication procedure of service subscription authentication for the UE in the second network.

In the following descriptions of the disclosure, well-known functions or configurations are not described in detail because they would obscure the disclosure with unnecessary details. Hereinafter, embodiments of the disclosure will now be described with reference to the accompanying drawings.

In the following description of embodiments of the disclosure, descriptions of techniques that are well known in the art and not directly related to the disclosure are omitted. This is to clearly convey the gist of the disclosure by omitting unnecessary descriptions. The terms used in the specification are defined in consideration of functions used in the disclosure, and can be changed according to the intent or commonly used methods of users or operators. Accordingly, definitions of the terms should be understood based on the entire description of the present specification.

For the same reason, some elements in the drawings are exaggerated, omitted, or schematically illustrated. Also, a size of each element does not entirely reflect an actual size. In the drawings, the same or corresponding elements are denoted by the same reference numerals.

The advantages and features of the disclosure and methods of achieving them will become apparent with reference to embodiments described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Throughout the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in embodiments, refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, according to an embodiment, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, according to an embodiment, a "unit" may include one or more processors.

In the following descriptions of the disclosure, well-known functions or configurations are not described in detail because they would obscure the disclosure with unnecessary details. Hereinafter, embodiments of the disclosure will now be described with reference to the accompanying drawings.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the disclosure is not limited to terms to be described below, and other terms indicating objects having equal technical meanings may be used. For example, in descriptions below, a UE may refer to a media access control (MAC) entity in a UE which exists in each of a master cell group (MCS) and a secondary cell group (SCG) to be described below.

For convenience of descriptions, in the disclosure, terms and names defined in the $3^{rd}$ Generation Partnership Project Long Term Evolution (3GPP LTE) standard are used therein. However, the disclosure is not limited to these terms and names, and may be equally applied to systems conforming to other standards.

Hereinafter, the term "base station" refers to an entity for allocating resources to a user equipment (UE) and may be used interchangeably with at least one of a gNode B, an eNode B, a node B, a base station (BS), a radio access unit, a base station controller, or a node over a network. The term "terminal" may be used interchangeably with a UE, a mobile station (MS), a cellular phone, a smartphone, a computer, or a multimedia system capable of performing communication functions. However, the disclosure is not limited to the examples.

In particular, the disclosure may be applied to the $5^{th}$ generation mobile communication standard (3GPP NR). The disclosure is applicable to intelligent services (e.g., smart home, smart building, smart city, smart car or connected car, healthcare, digital education, retail trade, security, and safety services) based on 5G communication technologies and Internet of things (IoT)-related technologies. In the disclosure, an evolved node B (eNB) may be interchangeably used with a next-generation node B (gNB) for convenience of descriptions. That is, a BS described by an eNB may represent a gNB. In the disclosure, the term "terminals" may refer to not only mobile phones, narrowband IoT (NB-IoT) devices, and sensors but also other wireless communication devices.

Wireless communication systems providing voice-based services in early stages are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD), ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The UL refers to a radio link for transmitting data or a control signal from a terminal (e.g., a UE or an MS) to a base station (e.g., an eNB or a BS), and the DL refers to a radio link for transmitting data or a control signal from the base station to the terminal. The above-described multiple access schemes identify data or control information of different users in a manner that time-frequency resources for carrying the data or control information of the users are allocated and managed not to overlap each other, that is, to achieve orthogonality therebetween.

As post-LTE systems, i.e., 5G systems need to support services capable of freely reflecting and simultaneously satisfying various requirements of users, service providers, and the like. Services considered for the 5G systems include enhanced mobile broadband (eMBB), massive machine-type communication (mMTC), ultra-reliability low-latency communication (URLLC) services, or the like.

According to an embodiment, the eMBB aims to provide an improved data rate than a data rate supported by the existing LTE, LTE-A, or LTE-Pro. For example, in a 5G communication system, the eMBB should be able to provide a peak data rate of 20 Gbps in a DL and a peak data rate of 10 Gbps in an UL at one BS. Also, it may be required for the 5G communication system to simultaneously provide a peak data rate and an increased user-perceived data rate of a terminal. In order to satisfy such requirements, it may be required for the 5G communication system to have improvement in various transmission/reception technologies including an improved multiple-input multiple-output (MIMO) transmission technology. Also, a data rate required in the 5G communication system may be satisfied as the 5G communication system uses a frequency bandwidth wider than 20 MHz in the 3 GHz to 6 GHz or 6 GHz or more frequency band, while the legacy LTE transmits a signal by using a maximum 20 MHz transmission bandwidth in the 2 GHz band.

Simultaneously, the mMTC is being considered to support application services such as IoT in 5G communication systems. In order to efficiently provide the IoT, the mMTC may require the support for a large number of terminals in a cell, improved coverage for a terminal, improved battery time, reduced cost of a terminal, and the like. Because the IoT is attached to various sensors and various devices to provide a communication function, the mMTC should be able to support a large number of terminals (e.g., 1,000,000 terminals/km$^2$) in a cell. Also, because a terminal supporting the mMTC is likely to be located in a shadow region failing to be covered by the cell, such as the basement of a building, due to the characteristics of the service, the terminal may require wider coverage than other services provided by the 5G communication systems. The terminal supporting the mMTC should be configured as a low-cost terminal and may require a very long battery life time such as 10 to 15 years because it is difficult to frequently replace the battery of the terminal.

Lastly, the URLLC refers to cellular-based wireless communication services used for mission-critical purposes such as services for remote control of robots or machinery, industrial automation, unmanned aerial vehicles, remote health care, emergency alerts, and the like. Accordingly, the URLLC should provide communications providing ultra-low latency and ultra reliability. For example, a service supporting the URLLC should satisfy air interface latency of less than 0.5 milliseconds, and simultaneously has a requirement for a packet error rate of $10^{-5}$ or less. Thus, for the service supporting the URLLC, the 5G system should provide a transmit time interval (TTI) smaller than other services and simultaneously has a design requirement for allocating wide resources in a frequency band so as to assure reliability of a communication link.

The afore-described three services, i.e., eMBB, URLLC, and mMTC, considered in the 5G communication system may be multiplexed and transmitted in one system. In this regard, in order to fulfill different requirements of the services, different transception schemes and different transception parameters may be used for the services. However, the above-described mMTC, URLLC, and eMBB are merely examples of different service types, and the service types to which the disclosure is applied are not limited thereto.

For convenience of descriptions, the disclosure uses terms and names defined in the $3^{rd}$ Generation Partnership Project (3GPP) long term evolution (LTE) rules that are the newest standard among current communication standards. However, the disclosure is not limited to the terms and names, and may be equally applied to communication systems conforming to other standards. In particular, the disclosure may be applied to the $5^{th}$ generation mobile communication standard (3GPP NR). Also, embodiments of the disclosure may be applied to other communication systems having similar technical backgrounds or channel types. Furthermore, embodiments of the disclosure are applicable to other communication systems through modification at the discretion of one of ordinary skill in the art without greatly departing from the scope of the disclosure.

Separately from a public mobile communication network using a mobile communication technology, a use scenario for configuring a non-public mobile communication network (hereinafter, the non-public network) particularly aiming to support communication between executives and staff members in a company or communication between devices or between staff members in a factory is being highlighted as a major use field of next-generation mobile communication. The non-public network is aimed to allow a UE registered at the non-public network to access the non-public network, separately from a general service provided by a public mobile communication network (hereinafter, the public network), and is aimed to provide a specialized service within coverage of the non-public network. Because a non-public network operator has to be able to actively manage and operate the non-public network, without interruption from a mobile network operator, there is a need for a method of controlling network registration of a UE to access both a public mobile communication network and a non-public network at which the UE is registered.

The disclosure provides a method by which, in a process of registering a UE at a network, the UE in response to a user request registers to use both a user-subscribed public mobile communication network and a non-public mobile communication network via a currently-accessed network.

According to an embodiment of the disclosure, in a process of registering a UE at a public network to use a mobile communication service in a wireless communication system, the UE in response to a user request or preset configuration in the UE may transmit first subscriber identification (ID) information for a public network access and subscriber authentication and second subscriber ID information for a non-public network access and subscriber authentication to a core network of the public network.

According to an embodiment of the disclosure, in a process of registering a UE at a non-public network to use a mobile communication service in a wireless communication system, the UE in response to a user request or preset configuration in the UE may transmit first subscriber ID information for a non-public network access and subscriber authentication and second subscriber ID information for a public network access and subscriber authentication to a core network of the non-public network.

Also, according to an embodiment of the disclosure, in a process of registering a UE at a public network or a non-public network to use a mobile communication service in a wireless communication system, a core network may determine whether the UE requests an additional access to the public network or the non-public network, based on subscriber ID information transmitted from the UE, and when authentication with a current network to which an access is attempted is successful, the core network may perform a necessary additional authentication procedure by determining the public network or the non-public network requested by the UE, based on second subscriber ID information of the UE.

Also, according to an embodiment of the disclosure, in a process of registering a UE at a public network to use a mobile communication service in a wireless communication system, when it is required for the UE to additionally register for a non-public network service in addition to a currently-identified public network, the UE may add information of a registration target non-public network and subscriber ID information provided by a non-public network operator in addition to subscriber ID information provided by a network operator and may transmit a registration request to the public network.

Also, according to an embodiment of the disclosure, in a process of registering a UE at a non-public network to use a mobile communication service in a wireless communication system, when it is required for the UE to additionally register for a public network service in addition to a currently-identified non-public network, the UE may add public network information provided by a public network operator and subscriber ID information provided by the public network operator in addition to subscriber ID information provided by a non-public network operator and may transmit a registration request to the non-public network.

According to a method and apparatus provided in the disclosure, provided is a method by which, in a mobile communication system where a public network and a non-public network coexist, a UE may register at the public network and the non-public network via one procedure regardless of a type of a network to which the UE currently accesses, and thus may use a service of the non-public network via the public network or may use a service of the public network via the non-public network.

More particularly, in a procedure where the UE receives network information broadcast by a current network at a random location and then accesses the corresponding network, the UE may transmit subscriber ID information for an access to the current network to the network. Also, when the UE needs to additionally access a public network or a non-public network, the UE transmit subscriber ID information allocated by the public network or the non-public network, and the network may perform a user authentication procedure with the current network by identifying the subscriber ID information transmitted from the UE. Also, when subscriber information additionally requesting an access to a public network or a non-public network is included, the network may perform an additional authentication procedure with an authentication server of the public network or the non-public network and may transmit a result thereof to the UE. In the afore-described procedure, the network performs location, movement, and session management of the UE in the current network, based on authentication information and policy information, and encryption key information which are received via a first authentication procedure, and performs session management to provide an additionally-requested service of the public network or the non-public network, based on authentication information and policy information, and encryption key information which are received via a second authentication procedure.

Figure 2:
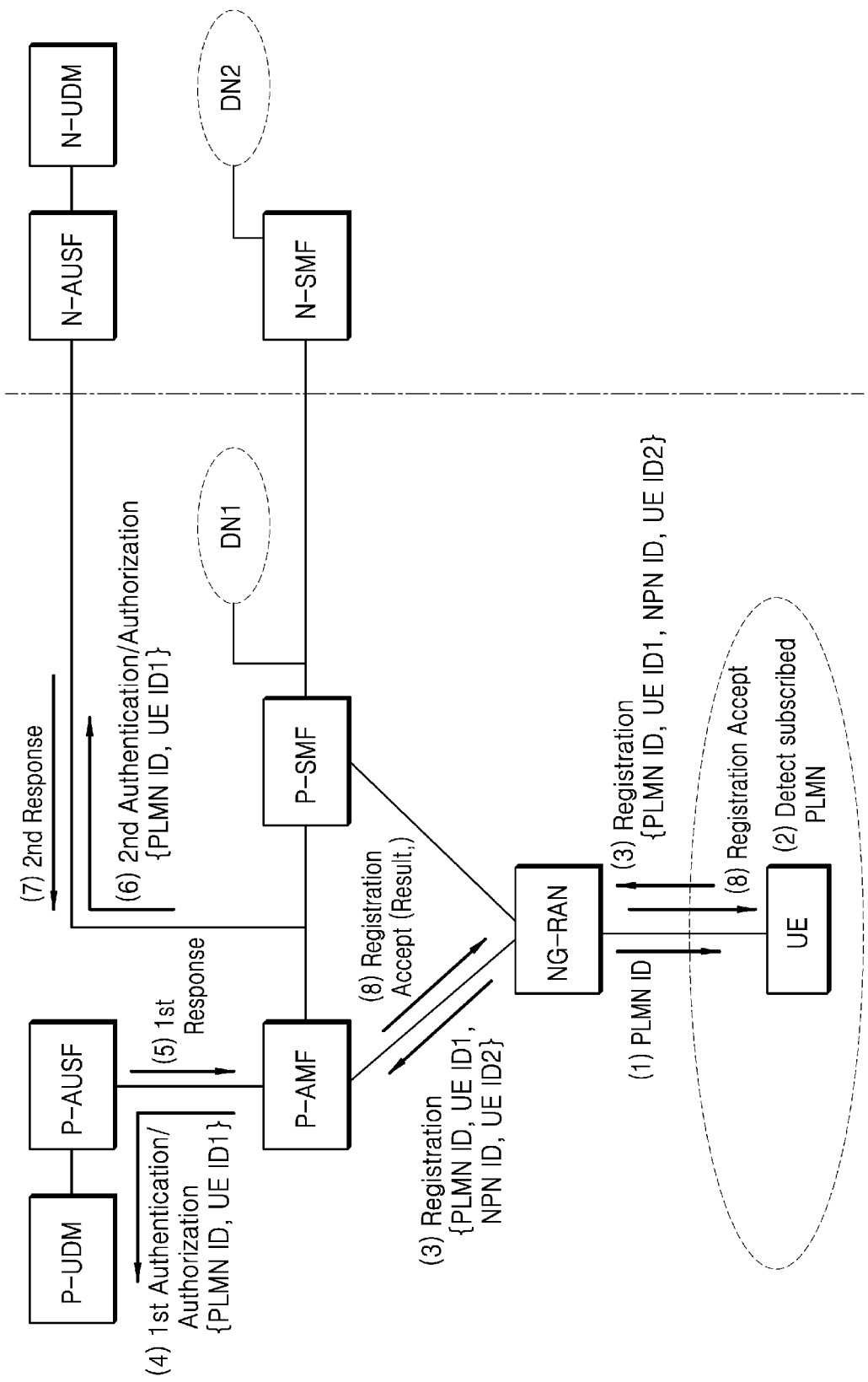

FIGS. 1 and 2 illustrate system architecture and an operation model for supporting authentication of a public network and a non-public network in a procedure of registering a UE, according to an embodiment of the disclosure. Obviously, the system architecture and the operation model of the present embodiment are not limited to the example of FIGS. 1 and 2, and more entities than the entities shown in FIGS. 1 and 2 may be included or fewer entities than the entities shown in FIGS. 1 and 2 may be included. In a communication system of FIGS. 1 and 2, entities may be distinguished therebetween according to network functions.

FIG. 1 illustrates architecture of a private (non-public) mobile network. According to an embodiment, a UE may include various devices capable of using a communication system. Also, according to an embodiment, a BS (NG-RAN) may be a BS that uses a 5G communication scheme.

According to an embodiment, an N-SMF may refer to a session management function (SMF) of a non-public (private) network and may be an entity configured to manage a session. When a UE has a plurality of sessions, an SMF may be allocated to each of the sessions and thus the UE may be connected to at least one SMF.

According to an embodiment, an N-AMF may refer to an access and mobility function of the non-public network and may be an entity configured to manage access and mobility of the UE. The UE may be connected to one AMF.

According to an embodiment, DN1 and DN2 may each refer to a data network (DN). The DN may transmit or receive a packet data unit (PDU) to or from the UE via a network entity and a BS.

According to an embodiment, an N-AUSF may refer to an authentication server function of the non-public network and may be an entity configured to store information for authentication of the UE. Also, according to an embodiment, an N-UDM may refer to unified data management (UDM) of the non-public network and may be an entity configured to store information of a user. Although not illustrated in FIG. 1, a policy control function (PCF) may be an entity configured to determine a policy related to billing.

Also, according to an embodiment, the UE may access a public network via the non-public network. Referring to FIG. 1, the non-public network and the public network may be connected.

FIG. 2 illustrates architecture of a public network.

According to an embodiment, P-SMF, P-AMF, P-UDM, and P-AUSF may refer to SMF, AMF, UDM, and AUSF of the public network, this corresponds to the architecture of the non-public network described above, and thus, detailed descriptions are not provided here.

Also, according to an embodiment, a UE may access a non-public network via the public network. Referring to FIG. 2, the non-public network and the public network may be connected.

Also, an operation of each entity in FIGS. 1 and 2 will be described in detail with reference to FIGS. 3 and 4 below.

Figure 3:
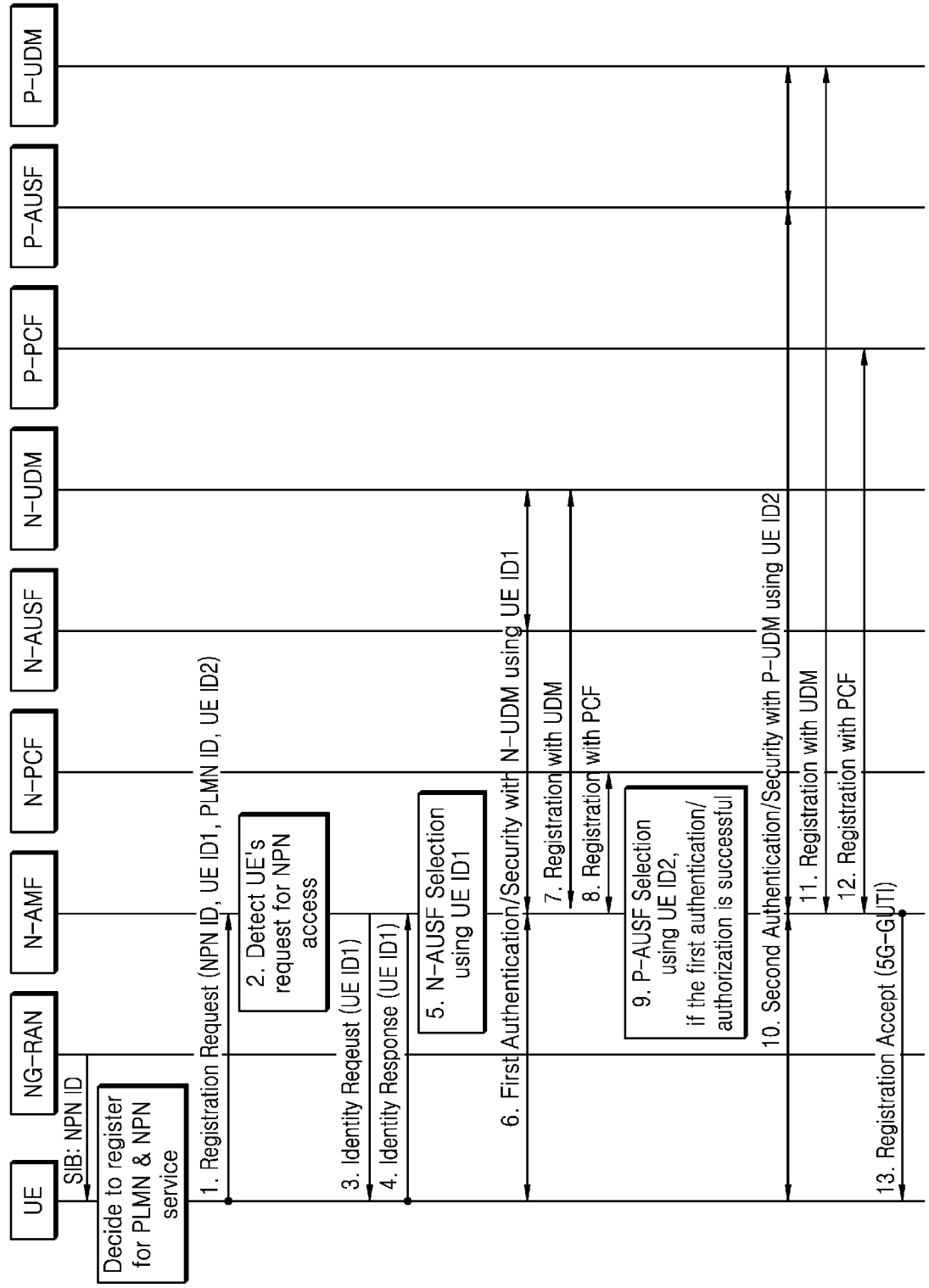
FIG. 3 illustrates an operation procedure of supporting public network registration and non-public network registration in a public network access procedure by a UE, according to an embodiment of the disclosure.

In detailed operations of a registration procedure according to an embodiment of the disclosure, when a UE attempts to access a non-public network as illustrated in FIG. 3, the UE may identify that a non-public network service to which a user has subscribed can be provided at a current location, based on broadcast system information, and then may determine (decide) whether to request use of a public network service in addition to the non-public network service.

In operation 1, when the UE needs to use the public network service, the UE transmits a registration request message to an N-AMF of the non-public network via a BS, the registration request message including subscriber information (UE ID1) for non-public network access authentication, public network information (public land mobile network ID (PLMN ID)) for requesting the use of a public network service, and user ID information (UE ID2) used in a public network. Also, in provided drawing, the registration request message may include non-public network information (non-public network ID (NPN ID)).

In operation 2, the N-AMF that is a core network device configured to manage a user access to the non-public network starts an authorization procedure for the UE to use the non-public network service, by identifying user ID information necessary for non-public network authentication from the registration request message received from the UE.

In operation 3, as a procedure for authenticating the UE based on UE's subscription information for the non-public network, the N-AMF requests, by using non-public network subscriber ID information (UE ID1) of the UE, stored user authentication information from UE corresponding to the ID information.

Operation 4 indicates a procedure in which the UE responds after the UE receives an authentication information request for the non-public network subscriber information (UE ID1) from the N-AMF of the non-public network. The authentication procedure may be performed through a plurality of message exchanges between the UE and the core network device (entity) of the non-public network, and may be performed according to a procedure of a general mobile communication network, and thus, detailed descriptions thereof are not provided here.

In operation 5, when the authentication procedure for the UE shown in operations 3 and 4 is successfully completed, the N-AMF performs a procedure of selecting an N-AUSF that is an authentication server of the non-public network which is configured to perform an authorization procedure for authenticating whether the UE has subscribed to a service in the non-public network.

In operation 6, the N-AMF performs a procedure of authenticating whether the UE has subscribed to a non-public network service, in association with the N-AUSF that is the authentication server of the non-public network selected in operation 5 and N-UDM that stores non-public network subscriber information.

When the authentication procedure for the non-public network service is successfully completed with respect to the UE, in operations 7 and 8, the N-AMF registers at each of the N-UDM and an N-PCF that the UE has started use of the non-public network service.

In operation 9, the N-AMF determines whether to proceed to a second authentication procedure for the UE to use the public network service, by checking whether the public network ID information (PLMN ID) for requesting the public network service and UE ID information (UE ID2) allocated by a network operator are included in the registration request message received from the UE in operation 1 and checking whether the authentication procedure for the UE is successfully completed in operation 6. When the UE ID information allocated by the network operator is not included in the registration request message, the UE may additionally transmit at least one of public network information and public network ID information.

When it is required for the UE to be authenticated with respect to use of the public network service, in operation 10, the N-AMF performs an authentication procedure for the public network service for the UE with P-UDM and a P-AUSF in the public network by using the UE ID information (UE ID2) of the UE for the public network.

When the authentication procedure of operation 10 is successfully completed, in operations 11 and 12, the N-AMF registers at each of the P-UDM and a P-PCF that the UE has started use of the public network service.

In operation 13, the N-AMF transmits, to the UE, results of authentication for the non-public network and public network services for the UE, and finishing a registration procedure.

According to an embodiment, when the authentication procedures of operations 3, 4, and 6 with respect to the non-public network subscriber ID information transmitted by the UE fail, the N-AMF skips all subsequent operations, and in operation 13, the N-AMF notifies failures in non-public network and public network registrations requested by the UE. Also, when the authentication procedures of operations 3, 4, and 6 with respect to the non-public network subscriber ID information transmitted by the UE are succeeded and authentication of the public network service of operation 10 fails, in operation 13, the N-AMF notifies the UE that only the non-public network service is available.

Figure 4:
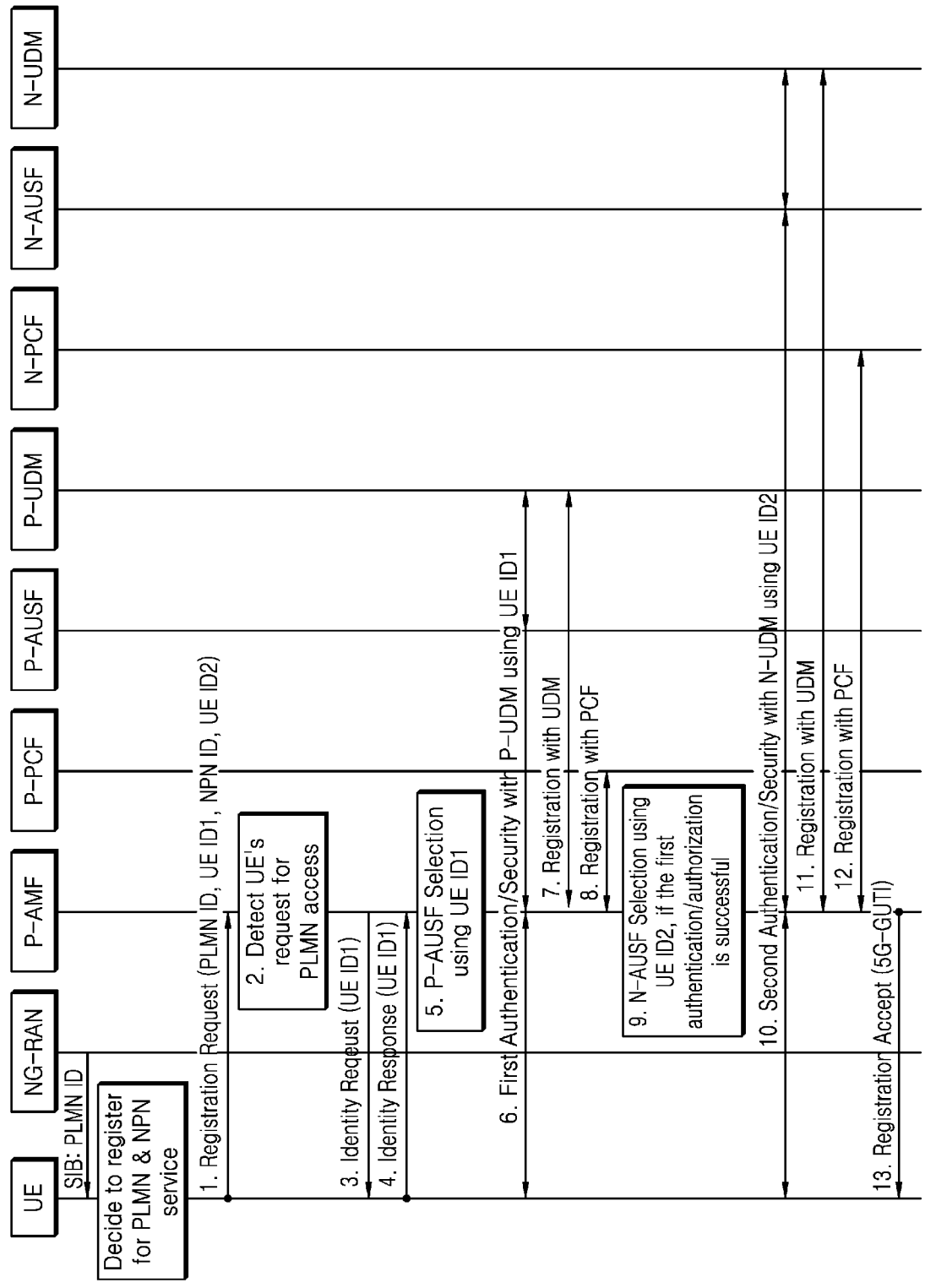
FIG. 4 illustrates an operation procedure of supporting non-public network registration and public network registration in a non-public network access procedure by a UE, according to an embodiment of the disclosure.

In detailed operations of a registration procedure according to an embodiment of the disclosure, when a UE attempts to access a public network as illustrated in FIG. 4, the UE may identify that a public network service to which a user has subscribed can be provided at a current location, based on broadcast system information, and then may determine whether to request use of a non-public network service in addition to the public network service.

In operation 1, when the UE needs to use the non-public network service, the UE transmits a registration request message to a P-AMF of the public network via a BS, the registration request message including subscriber information (UE ID1) for public network access authentication, non-public network information (NPN ID) for requesting the use of a non-public network service, and user ID information (UE ID2) used in a non-public network. Also, in provided drawing, the registration request message may include public network information (PLMN ID).

In operation 2, the P-AMF that is a core network device configured to manage a user access to the public network starts an authorization procedure for the UE to use the public network service, by identifying user ID information necessary for authentication of a subscriber in the public network from the registration request message received from the UE.

In operation 3, as a procedure for authenticating the UE based on UE's subscription information for the public network, the P-AMF requests, by using public network subscriber ID information of the UE, user authentication information corresponding to THE public network subscriber ID information (UE ID1) stored in the UE.

Operation 4 indicates a procedure in which the UE responds after the UE receives an authentication information request for the public network subscriber ID information (UE ID1) from the P-AMF of the public network. The authentication procedure may be performed through a plurality of message exchanges between the UE and the core network device in the public network, and may be performed according to a procedure of a general mobile communication network, and thus, detailed descriptions thereof are not provided here.

In operation 5, when the authentication procedure for the UE shown in operations 3 and 4 is successfully completed, the P-AMF performs a procedure of selecting a P-AUSF that is an authentication server in the public network which is configured to perform a service authorization procedure for authenticating whether the UE has subscribed to a service in the public network.

In operation 6, the P-AMF performs a procedure of authenticating whether the UE has subscribed to a public network service, in association with the P-AUSF that is the authentication server of the public network selected in operation 5 and P-UDM that stores subscriber information for the public network.

When the authentication procedure for the public network service is successfully completed with respect to the UE, in operations 7 and 8, the P-AMF registers at each of the P-UDM and a P-PCF that the UE has started use of the public network service.

In operation 9, the P-AMF determines whether to proceed to a second authentication procedure for the UE to use the non-public network service, by checking whether the non-public network ID information (NPN ID) for requesting the non-public network service and UE ID information (UE ID2) allocated by a non-public network operator are included in the registration request message received from the UE in operation 1 and checking whether the authentication procedure for the UE is successfully completed in operation 6. When at least one of the non-public network ID information and the UE ID information is not included in the registration request message, the UE may additionally transmit at least one of the non-public network ID information and the UE ID information.

When it is required for the UE to be authenticated with respect to use of the non-public network service, in operation 10, the P-AMF detects N-UDM and an N-AUSF located in the non-public network by using the non-public network ID information (NPN ID) of the UE and the UE ID information (UE ID2) allocated by the non-public network, and performs an authentication procedure for the non-public network service for the UE by interoperating with the N-UDM and the N-AUSF.

When the authentication procedure of operation 10 is successfully completed, in operations 11 and 12, the P-AMF registers at each of the N-UDM and an N-PCF that the UE has started use of the non-public network service.

In operation 13, the P-AMF transmits, to the UE, results of authentication for the public network and non-public network services for the UE, and finishing a registration procedure.

According to an embodiment, when the authentication procedures of operations 3, 4, and 6 with respect to the public network subscriber ID information transmitted by the UE fail, the P-AMF skips all subsequent operations, and in operation 13, the P-AMF notifies failures in public network and non-public network registrations requested by the UE. Also, when the authentication procedures of operations 3, 4, and 6 with respect to the public network subscriber ID information transmitted by the UE are succeeded and authentication of the non-public network service of operation 10 fails, in operation 13, the P-AMF notifies the UE that only the public network service is available.

Figure 5:
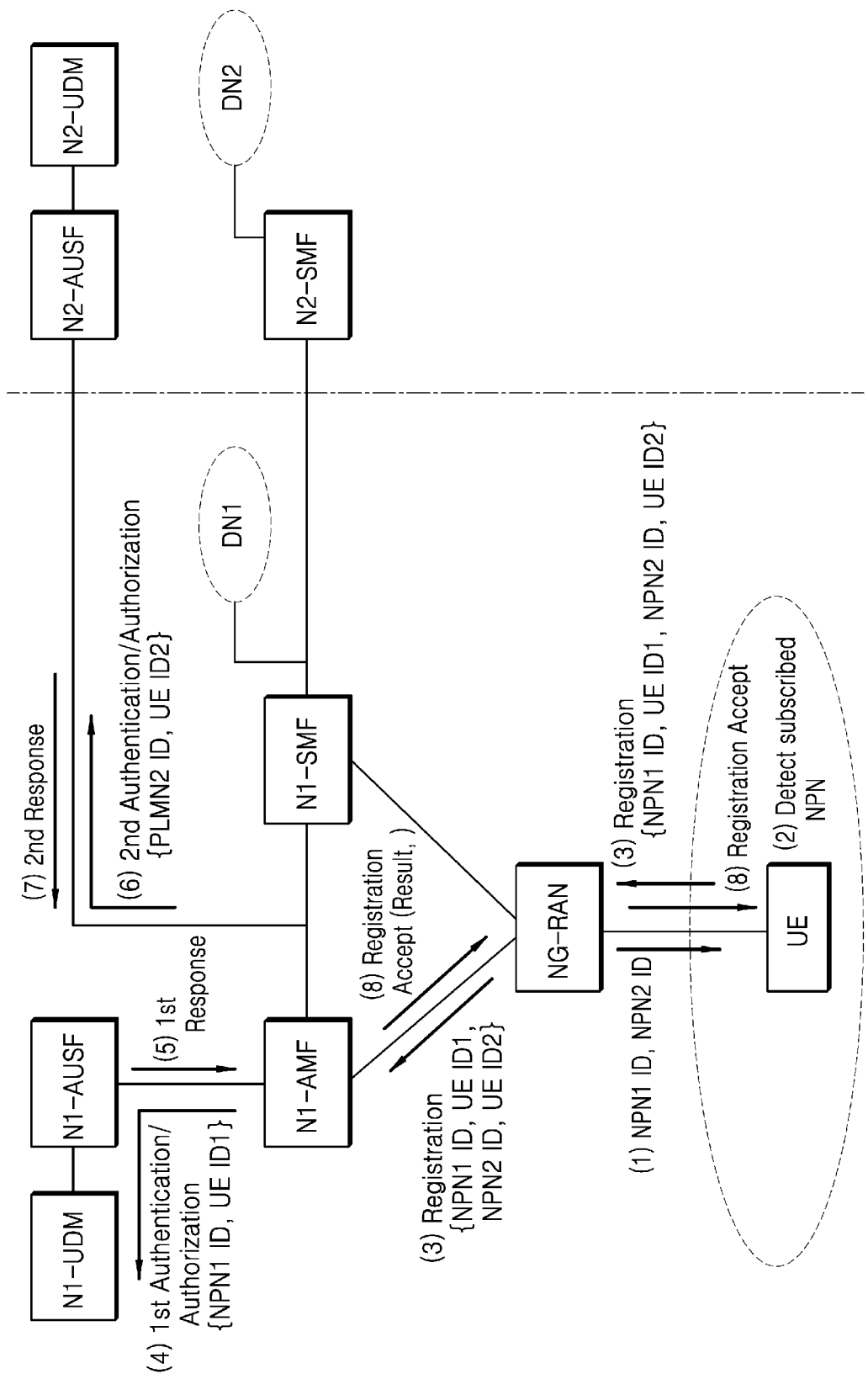
FIG. 5 illustrates system architecture and an operation model for accessing a plurality of non-public networks via one network according to an embodiment of the disclosure.

Another embodiment of a registration procedure proposed in the disclosure is related to, as shown in FIG. 5, a case of accessing two different non-public networks via one network. FIG. 5 illustrates system architecture and an operation model for accessing a plurality of non-public networks via one network according to an embodiment of the disclosure.

Referring to FIG. 5, two different non-public networks may have architecture in which an access to one non-public network is available via the other non-public network. The two different non-public networks may share a non-public network-common wireless network ID (PLMN ID for a non-public network), or may use separate wireless network IDs for non-public networks.

A UE may perform an access procedure via two non-public networks by using a method of transmitting a registration request message including at least two non-public network IDs (NPN IDs) the UE attempts to access, as in FIG. 5. Detailed operations may be equal to those described with reference to FIGS. 1 and 2, by substituting a public network ID for different non-public network ID. Operations thereof will now be provided in detail with reference to FIG. 6.

Figure 6:
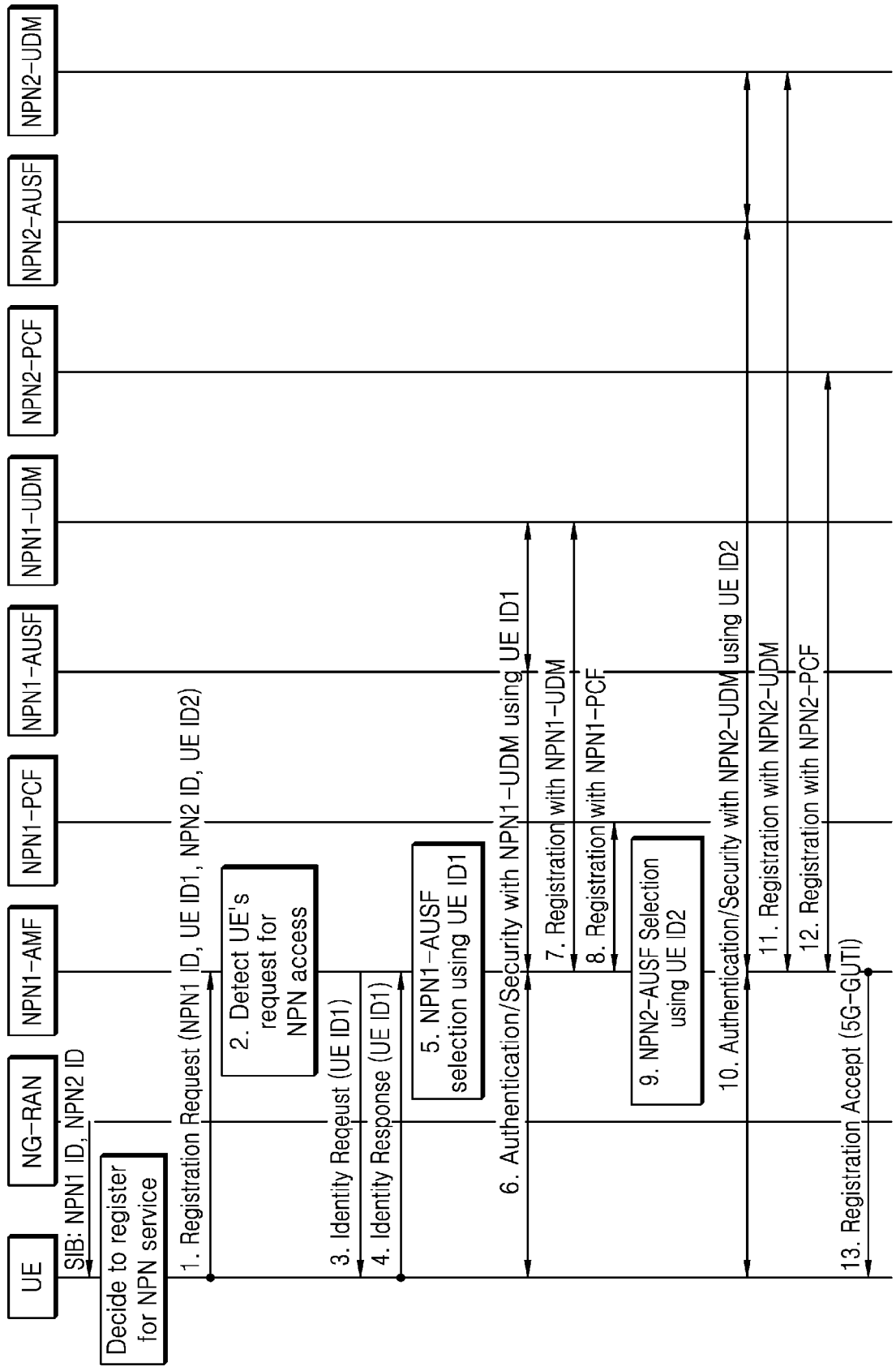
FIG. 6 illustrates an operation procedure of accessing a plurality of non-public networks via one network according to an embodiment of the disclosure.

FIG. 6 illustrates an operation procedure of accessing a plurality of non-public networks via one network according to an embodiment of the disclosure.

Referring to FIG. 6, operations of a case where a UE attempts to access two non-public networks are illustrated.

In detailed operations of a registration procedure according to an embodiment of the disclosure, when the UE attempts to access a non-public network as in FIG. 6, the UE may receive first non-public network ID information (NPN1 ID) and second non-public network ID information (NPN2 ID) through broadcast system information. The UE may identify that first non-public network and second non-public network services to which a user has subscribed can be provided at a current location, and then may determine whether to request use of the first non-public network and second non-public network services.

In operation 1, the UE transmits a registration request message to an NPN1-AMF (the AMF of a first non-public network) via a BS, the registration request message including first non-public network UE ID information (UE ID1) for first non-public network access authentication, the first non-public network ID information (NPN1 ID), second non-public network UE ID information (UE ID2) for second non-public network access authentication, and the second non-public network ID information (NPN2 ID).

In operation 2, the NPN1-AMF that is a core network device configured to manage a user access to the first non-public network starts an authorization procedure for the UE to use a non-public network service, by identifying user ID information necessary for first non-public network authentication from the registration request message received from the UE.

In operation 3, as a procedure for authenticating the UE based on UE's subscription information for the first non-public network, the NPN1-AMF requests, by using the first non-public network UE ID information (UE ID1) of the UE for first non-public network subscriber ID, stored user authentication information from the UE corresponding to the ID information.

Operation 4 indicates a procedure in which the UE responds after the UE receives an authentication information request for the first non-public network UE ID information (UE ID1) from the NPN1-AMF. The authentication procedure may be performed through a plurality of message exchanges between the UE and the core network device (entity) of the first non-public network, and may be performed according to a procedure of a general mobile communication network, and thus, detailed descriptions thereof are not provided here.

In operation 5, when the authentication procedure for the UE shown in operations 3 and 4 is successfully completed, the NPN1-AMF performs a procedure of selecting an NPN1-AUSF that is an authentication server of the first non-public network which is configured to perform an authorization procedure for authenticating whether the UE has subscribed to a service in the first non-public network.

In operation 6, the NPN1-AMF performs a procedure of authenticating whether the UE has subscribed to the first non-public network service, in association with the NPN1-AUSF that is the authentication server of the first non-public network selected in operation 5 and NPN1-UDM that stores first non-public network subscriber information.

When the authentication procedure for the first non-public network service is successfully completed with respect to the UE, in operations 7 and 8, the NPN1-AMF registers at each of the NPN1-UDM and an NPN1-PCF that the UE has started use of the first non-public network service.

In operation 9, the NPN1-AMF may perform a procedure of selecting an NPN2-AUSF that is an authentication server of the second non-public network which is configured to perform an authorization procedure for authenticating whether the UE has subscribed to a service in the second non-public network, by using the second non-public network UE ID information.

According to an embodiment, the NPN1-AMF may determine whether to perform a second authorization procedure for the UE to use the second non-public network service, by checking whether the second non-public network ID information (NPN2 ID) and the second non-public network UE ID information (UE ID2) for a second non-public network service request are included in the registration request message received from the UE in operation 1 and checking whether service authentication for the UE has succeeded in operation 6. However, the disclosure is not limited to the example above.

Also, according to an embodiment, when the second non-public network UE ID information (UE ID2) or the second non-public network ID information (NPN2 ID) is not included in the registration request message, the UE may additionally transmit at least one of the second non-public network ID information (NPN2 ID) and the second non-public network UE ID information (UE ID2).

When it is required for the UE to be authenticated with respect to use of the second non-public network service, in operation 10, the NPN1-AMF performs an authentication procedure for the second non-public network service for the UE with NPN2-UDM and an NPN2-AUSF in the second non-public network by using the second non-public network UE ID information (UE ID2) of the UE.

When the authentication procedure of operation 10 is successfully completed, in operations 11 and 12, the NPN1-AMF registers at each of the NPN2-UDM and an NPN2-PCF that the UE has started use of the second non-public network service.

In operation 13, the NPN1-AMF transmits, to the UE, results of authentication for the first and second non-public network services for the UE, and finishing a registration procedure.

According to an embodiment, when the authentication procedures of operations 3, 4, and 6 with respect to the first non-public network UE ID information (UE ID1) transmitted by the UE fail, the NPN1-AMF skips all subsequent operations, and in operation 13, the NPN1-AMF notifies failures in first and second non-public network registrations requested by the UE. Also, when the authentication procedures of operations 3, 4, and 6 with respect to the first non-public network UE ID information transmitted by the UE are succeeded and authentication of the second non-public network service of operation 10 fails, in operation 13, the NPN1-AMF notifies the UE that only the first non-public network service is available.

That is, the UE includes, in a registration message, non-public network identifiers for respectively accessing the first non-public network and the second non-public network and UE identifiers for identifying the UE in non-public networks, respectively, and performs an authentication procedure with each of networks as described above with reference to FIGS. 3 and 4, and results thereof are transmitted to the UE through registration acceptance messages.

Figure 7:
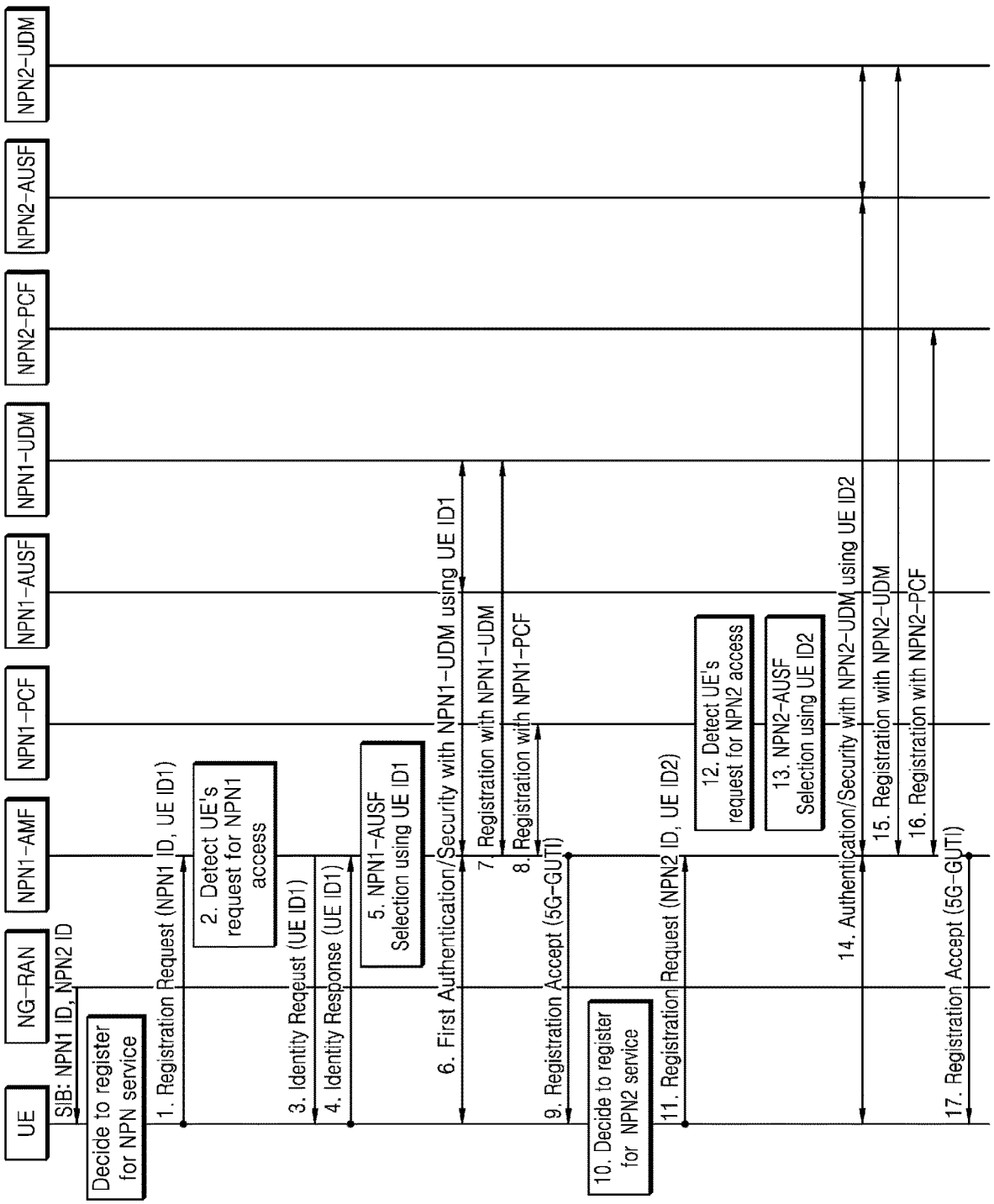
FIG. 7 illustrates an operation procedure of registering at a second non-public network after a first non-public network registration procedure is completed, according to an embodiment of the disclosure.

FIG. 7 illustrates a procedure in which, after a UE completes a registration procedure with respect to a first non-public network when the UE accesses two non-public networks, the UE additionally performs a registration procedure with respect to a second non-public network.

In detailed operations of a registration procedure according to an embodiment of the disclosure, when the UE attempts to access a non-public network as illustrated in FIG. 7, the UE may receive first non-public network ID information (NPN1 ID) and second non-public network ID information (NPN2 ID) through broadcast system information. The UE may identify that first non-public network and second non-public network services to which a user has subscribed can be provided at a current location, and then may determine whether to request use of the first non-public network service.

In operation 1, the UE transmits a registration request message to an NPN1-AMF (the AMF of a first non-public network) via a BS, the registration request message including first non-public network UE ID information (UE ID1)

for first non-public network access authentication, and the first non-public network ID information (NPN1 ID).

In operation 2, the NPN1-AMF that is a core network device configured to manage a user access to the first non-public network starts an authorization procedure for the UE to use the first non-public network service, by identifying user ID information necessary for first non-public network authentication from the registration request message received from the UE.

In operation 3, the NPN1-AMF may detect (identify) a request of the UE to access the first non-public network. As a procedure for authenticating the UE based on UE's subscription information for the first non-public network, the NPN1-AMF requests, by using the first non-public network UE ID information (UE ID1) of the UE for first non-public network subscriber ID, stored user authentication information from the UE corresponding to the ID information.

Operation 4 indicates a procedure in which the UE responds after the UE receives an authentication information request for the first non-public network UE ID information (UE ID1) from the NPN1-AMF. The authentication procedure may be performed through a plurality of message exchanges between the UE and the core network device (entity) of the first non-public network, and may be performed according to a procedure of a general mobile communication network, and thus, detailed descriptions thereof are not provided here.

In operation 5, when the authentication procedure for the UE shown in operations 3 and 4 is successfully completed, the NPN1-AMF performs a procedure of selecting an NPN1-AUSF that is an authentication server of the first non-public network which is configured to perform an authorization procedure for authenticating whether the UE has subscribed to a service in the first non-public network.

In operation 6, the NPN1-AMF performs a procedure of authenticating whether the UE has subscribed to the first non-public network service, in association with the NPN1-AUSF that is the authentication server of the first non-public network selected in operation 5 and NPN1-UDM that stores first non-public network subscriber information.

When the authentication procedure for the first non-public network service is successfully completed with respect to the UE, in operations 7 and 8, the NPN1-AMF registers at each of the NPN1-UDM and an NPN1-PCF that the UE has started use of the first non-public network service.

In operation 9, the NPN1-AMF may transmit, to the UE, a result of authentication for the first non-public network service for the UE. Obviously, the result of authentication for the first non-public network service in operation 9 may be transmitted together with a result of authentication for the second non-public network service in operation 17 to be described below.

Also, according to an embodiment, when the authentication procedures of operations 3, 4, and 6 with respect to the first non-public network UE ID information (UE ID1) transmitted by the UE fail, the NPN1-AMF may notify a failure in first non-public network registration in operation 9.

In operation 10, the UE may determine whether to request use of the second non-public network service.

In operation 11, the UE transmits a registration request message to the NPN1-AMF via the BS, the registration request message including second non-public network UE ID information (UE ID2) for second non-public network access authentication, and the second non-public network ID information (NPN2 ID).

In operation 12, the NPN1-AMF may detect (identify) a request of the UE to access the second non-public network. The NPN1-AMF starts an authorization procedure for the UE to use the second non-public network service, by identifying user ID information (e.g., the second non-public network UE ID information) necessary for second non-public network authentication from the registration request message received from the UE.

According to an embodiment of the disclosure, the NPN1-AMF may exchange, with the UE, a request and a response with respect to authentication information of the second non-public network UE ID information. The exchange may correspond to descriptions provided with reference to operations 3 and 4.

In operation 13, the NPN1-AMF performs a procedure of selecting an NPN2-AUSF that is an authentication server of the second non-public network which is configured to perform an authorization procedure for authenticating whether the UE has subscribed to a service in the second non-public network.

In operation 14, the NPN1-AMF performs a procedure of authenticating whether the UE has subscribed to the second non-public network service, in association with the NPN2-AUSF that is the selected authentication server of the second non-public network and NPN2-UDM that stores second non-public network subscriber information.

When the authentication procedure for the second non-public network service is successfully completed with respect to the UE, in operations 15 and 16, the NPN2-AMF registers at each of the NPN2-UDM and an NPN2-PCF that the UE has started use of the second non-public network service.

In operation 17, the NPN1-AMF may transmit, to the UE, a result of authentication for the second non-public network service for the UE. Obviously, the NPN1-AMF may transmit the result of authentication for the first non-public network service together with the result of authentication for the second non-public network service in operation 17, instead of operation 9.

According to an embodiment, when the authentication procedures of operations 3, 4, and 6 with respect to the first non-public network UE ID information (UE ID1) transmitted by the UE fail, the NPN1-AMF may notify a failure in first non-public network registration requested by the UE, in operation 9. Also, when the authentication procedures of operations 3, 4, and 6 with respect to the first non-public network UE ID information transmitted by the UE are succeeded and authentication of the second non-public network service of operation 14 fails, in operation 17, the NPN1-AMF may notify the UE that the second non-public network registration has failed.

That is, in the procedure, the UE transmits a control message (in the embodiment, the registration request message is provided as an example but a separate message may be used) to the second non-public network via the first non-public network, performs the authentication procedure on the second non-public network through a subscriber authentication procedure with respect to the second non-public network, and receives a result thereof through a response message.

According to embodiments of the disclosure, the UE may access a service of a non-public network via a public network by registering at the public network and the non-public network via a currently-accessed network in a network registration procedure in a wireless communication system, and even when the UE accesses the non-public network, a user may continuously use a service of the public network. When embodiments of the disclosure are applied, the UE may use services of the public network and the non-public network via one BS, instead of respectively accessing BSs for the public network and the non-public network, and thus, it is not requested for the UE to be implemented with additional model equipment for a simultaneous access to BSs, which is requested in a scheme according to the related art, such that complexity and costs in implementation may be reduced.

Figure 8:
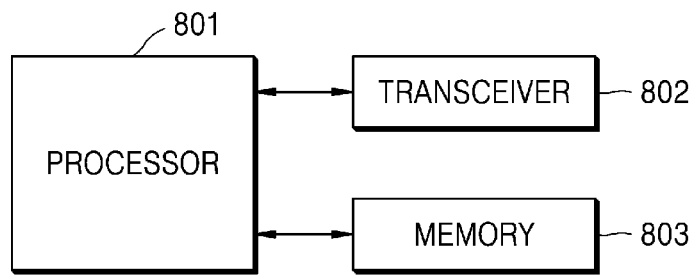
FIG. 8 illustrates a configuration of a UE, according to an embodiment of the disclosure.

FIG. 8 illustrates a configuration of a UE, according to an embodiment of the disclosure.

As illustrated in FIG. 8, the UE of the disclosure may include a processor 801, a transceiver 802, and a memory 803. However, elements of the UE are not limited to the afore-described example. For example, the UE may include more elements than the afore-described elements or may include fewer elements than the afore-described elements. Also, the processor 801, the transceiver 802, and the memory 803 may be integrated to one chip.

According to an embodiment, the processor 801 may control a series of procedures to make the UE operate according to the afore-described embodiments of the disclosure. For example, the processor 801 may control the elements of the UE to perform a method of supporting an access to a non-public mobile communication network and a public mobile communication network according to an embodiment of the disclosure. The processor 801 may refer to a plurality of processors, and may perform the afore-described method of supporting an access to a non-public mobile communication network and a public mobile communication network of the disclosure by executing a program stored in the memory 803.

The transceiver 802 may transmit or receive a signal to or from a BS. The signal transmitted or received to or from the BS may include control information and data. The transceiver 802 may include a radio frequency (RF) transmitter for up-converting and amplifying a frequency of a signal to be transmitted, and an RF receiver for low-noise amplifying and down-converting a frequency of a received signal. However, these are merely examples of the transceiver 802, and the elements of the transceiver 802 are not limited to the RF transmitter and the RF receiver. Also, the transceiver 802 may receive a signal through a radio channel and output the signal to the processor 801, and may transmit a signal output from the processor 801, through a radio channel.

According to an embodiment, the memory 803 may store the program and data necessary for operations of the UE. Also, the memory 803 may store control information or data included in a signal transmitted or received by the UE. The memory 803 may be implemented as a storage medium including a read-only memory (ROM), a random access memory (RAM), a hard disk, a compact disc-ROM (CD-ROM), a digital versatile disc (DVD), or the like, or any combination thereof. Also, the memory 803 may refer to a plurality of memories. According to an embodiment, the memory 803 may store a program for performing a method of registering a UE or supporting a UE's access to a non-public network or a public network according to the afore-described embodiments of the disclosure.

Figure 9:
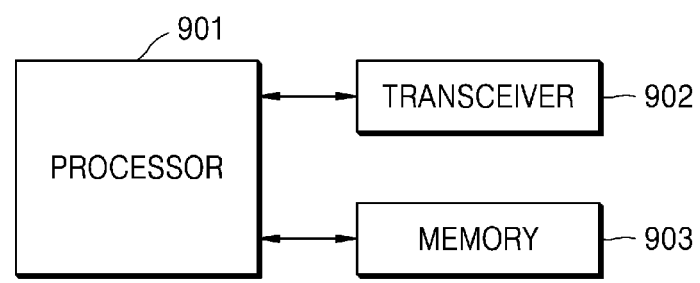
FIG. 9 illustrates a configuration of a network function (NF), according to an embodiment of the disclosure.

FIG. 9 illustrates a configuration of a network function (NF), according to an embodiment of the disclosure.

As illustrated in FIG. 9, the NF (or a network entity) of the disclosure may include a processor 901, a transceiver 902, and a memory 903. However, elements of the NF are not limited to the afore-described example. For example, the NF may include more elements than the afore-described elements or may include fewer elements than the afore-described elements. Also, the processor 901, the transceiver 902, and the memory 903 may be integrated to one chip. Also, a BS may be equal to or correspond to the configuration of the NF of FIG. 9. The NF may include the AMF, the SMF, the PCF, the UDM, the AUSF, and the like described above, and is not limited to the example.

The processor 901 may control a series of procedures to make the NF operate according to the afore-described embodiments of the disclosure. For example, the processor 901 may control the elements of the NF to perform a method of supporting an access to a non-public mobile communication network and a public mobile communication network according to an embodiment of the disclosure.

The transceiver 902 may transmit or receive a signal to or from a UE or a BS. The signal transmitted or received to or from the UE or the BS may include control information and data. The transceiver 902 may include a RF transmitter for up-converting and amplifying a frequency of a signal to be transmitted, and an RF receiver for low-noise amplifying and down-converting a frequency of a received signal. However, these are merely examples of the transceiver 902, and the elements of the transceiver 902 are not limited to the RF transmitter and the RF receiver. Also, the transceiver 902 may receive a signal through a radio channel and output the signal to the processor 901, and may transmit a signal output from the processor 901, through a radio channel. The processor 901 may refer to a plurality of processors, and may perform the afore-described method of supporting an access to a non-public mobile communication network and a public mobile communication network of the disclosure by executing a program stored in the memory 903.

According to an embodiment, the memory 903 may store the program and data necessary for operations of the NF. Also, the memory 903 may store control information or data included in a signal transmitted or received by the NF. The memory 903 may be implemented as a storage medium including a ROM, a RAM, a hard disk, a CD-ROM, a DVD, or the like, or any combination thereof. Also, the memory 903 may refer to a plurality of memories. According to an embodiment, the memory 903 may store a program for performing a method of supporting an access to a non-public mobile communication network and a public mobile communication network according to the afore-described embodiments of the disclosure.

The methods according to embodiments of the disclosure as described in the specification or in the following claims may be implemented as hardware, software, or a combination of hardware and software.

When the methods are implemented in software, a computer-readable storage medium storing one or more programs (software modules) may be provided. The one or more programs stored in the computer-readable storage medium are configured to be executable by one or more processors in an electronic device. The one or more programs include instructions for causing the electronic device to execute the methods according to the embodiments of the disclosure described in the claims or the specification.

The programs (e.g., software modules or software) may be stored in RAM, non-volatile memory including flash memory, ROM, electrically erasable programmable read-only memory (EEPROM), a magnetic disc storage device, a CD-ROM, a DVD, another type of optical storage device, or a magnetic cassette. Alternatively, the programs may be stored in a memory including a combination of some or all of the above-mentioned memory devices. In addition, each memory device may be included by a plural number.

Also, the programs may be stored in an attachable storage device which is accessible via a communication network such as the Internet, an intranet, a local area network (LAN), a wireless LAN (WLAN), or a storage area network (SAN), or a combination thereof. The storage device may be connected via an external port to an apparatus performing the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of descriptions and the disclosure is not limited thereto. As such, an element expressed in a plural form may also be configured as a single element, and an element expressed in a singular form may also be configured as plural elements.

While one or more embodiments have been described above with reference to the specification and drawings, the embodiments are for the purpose of promoting an understanding of the disclosure only and are not intended to be limiting the scope of the disclosure. In other words, it will be apparent to one of ordinary skill in the art that other modifications based on the technical ideas of the disclosure are feasible. Also, the embodiments may be combined to be implemented, when required. For example, portions of an embodiment and another embodiment of the disclosure may be combined with each other to enable the BS and the UE to operate. Also, embodiments of the disclosure may be applied to other communication systems, and modifications based on the technical scope of the embodiments may be implemented.

The invention claimed is:

1. A method of registering a user equipment (UE) at a second network via a first network, by an access and mobility management function (AMF) of the first network in a wireless communication, the method comprising:
    receiving, from the UE, a registration request message comprising at least one of first network identification (ID) information, ID information of the UE in the first network, second network ID information, and ID information of the UE in the second network;
    selecting an authentication server function (AUSF) of the first network which is configured to perform a first authentication procedure of service subscription authentication for the UE in the first network;
    performing the first authentication procedure with the AUSF of the first network and unified data management (UDM) of the first network;
    determining, based on a result of the first authentication procedure, whether to perform a second authentication procedure of service subscription authentication for the UE in the second network;
    performing, based on a result of the determining, the second authentication procedure with an AUSF of the second network and UDM of the second network; and
    transmitting, to the UE, a registration acceptance message comprising information of at least one of the result of the first authentication procedure and a result of the second authentication procedure.

2. The method of claim 1, further comprising:
    requesting the UE for stored UE authentication information; and
    receiving, from the UE, the UE authentication information.

3. The method of claim 1, further comprising registering information indicating that the UE has started use of a first network service, at the UDM of the first network and a policy control function (PCF) of the first network, based on the result of the first authentication procedure.

4. The method of claim 1, further comprising registering information indicating that the UE has started use of a second network service, at the UDM of the first network and a PCF of the first network, based on the result of the second authentication procedure.

5. The method of claim 1, wherein the performing of, based on the result of the determining, the second authentication procedure with the AUSF of the second network for the service subscription authentication for the UE in the second network comprises:
    determining whether the second network ID information and the ID information of the UE in the second network are comprised in the registration request message; and
    obtaining, from the UE, at least one of the second network ID information and the ID information of the UE in the second network, based on a result of the determining.

6. The method of claim 1, wherein the first network is a non-public network, and the second network is a public network.

7. The method of claim 1, wherein the first network is a public network, and the second network is a non-public network.

8. An access and mobility management function (AMF) of a first network which registers a user equipment (UE) at a second network via the first network, the AMF comprising:
    a transceiver; and
    a controller combined with the transceiver and configured to receive, from the UE, a registration request message comprising at least one of first network identification (ID) information, ID information of the UE in the first network, second network ID information, and ID information of the UE in the second network, select an authentication server function (AUSF) of the first network which is configured to perform a first authentication procedure of service subscription authentication for the UE in the first network, perform the first authentication procedure with the AUSF of the first network and unified data management (UDM) of the first network, determine, based on a result of the first authentication procedure, whether to perform a second authentication procedure of service subscription authentication for the UE in the second network, perform, based on a result of the determining, the second authentication procedure with an AUSF of the second network and UDM of the second network, and transmit, to the UE, a registration acceptance message comprising information of at least one of the result of the first authentication procedure and a result of the second authentication procedure.

9. The AMF of claim 8, wherein the controller is configured to request the UE for stored UE authentication information, and receive the UE authentication information from the UE.

10. The AMF of claim 8, wherein the controller is configured to register information indicating that the UE has started use of a first network service, at the UDM of the first network and a policy control function (PCF) of the first network, based on the result of the first authentication procedure.

11. The AMF of claim 8, wherein the first network is a public network, and the second network is a non-public network.

\* \* \* \* \*